US009270031B2

(12) United States Patent
Portas

(10) Patent No.: US 9,270,031 B2
(45) Date of Patent: Feb. 23, 2016

(54) PROCESSES FOR MANUFACTURING JOINTING ASSEMBLIES FOR MEDIUM OR HIGH VOLTAGE ELECTRICAL CABLES AND JOINTING ASSEMBLIES OBTAINABLE BY THE PROCESSES

(75) Inventor: Francesco Portas, Milan (IT)

(73) Assignee: PRYSMIAN S.P.A., Milan (IT)

( * ) Notice: Subject to any disclaimer, the term of this patent is extended or adjusted under 35 U.S.C. 154(b) by 208 days.

(21) Appl. No.: 13/992,920

(22) PCT Filed: Dec. 22, 2010

(86) PCT No.: PCT/EP2010/007852
§ 371 (c)(1),
(2), (4) Date: Aug. 26, 2013

(87) PCT Pub. No.: WO2012/083985
PCT Pub. Date: Jun. 28, 2012

(65) Prior Publication Data
US 2013/0333945 A1 Dec. 19, 2013

(51) Int. Cl.
H01R 4/10 (2006.01)
H02G 15/064 (2006.01)
(Continued)

(52) U.S. Cl.
CPC ............... *H01R 4/10* (2013.01); *H02G 15/064* (2013.01); *H02G 15/184* (2013.01); *H02G 15/182* (2013.01); *H02G 15/1806* (2013.01); *Y10T 29/49174* (2015.01)

(58) Field of Classification Search
CPC ........................................................ H01R 4/10
USPC .......................................... 174/84 R; 29/857
See application file for complete search history.

(56) References Cited

U.S. PATENT DOCUMENTS 4,390,745 A 6/1983 Böttcher et al.
5,985,062 A * 11/1999 Vallauri et al. .................. 156/51
(Continued)

FOREIGN PATENT DOCUMENTS

EP 0435569 A1 7/1991
EP 0683557 A1 11/1995
(Continued)

OTHER PUBLICATIONS

International Search Report PCT/ISA/210 for PCT/EP2010/007852 dated Oct. 6, 2011.
(Continued)

Primary Examiner — Timothy Thompson
Assistant Examiner — Charles Pizzuto
(74) Attorney, Agent, or Firm — Harness, Dickey & Pierce PLC

(57) ABSTRACT

A process for manufacturing a jointing assembly for medium or high voltage electrical cables may include: forming a tubular element made from semi-conductive material; cutting out of the tubular element first and second cylindrical elements; machining an end portion of the first and second cylindrical elements to provide the end portions with an at least partially rounded profile; arranging the first cylindrical element at a radially inner surface of an elastomeric sleeve made from dielectric material; arranging the second cylindrical element at a free end portion of the elastomeric sleeve, spaced apart from the first cylindrical element, with the at least partially rounded profile end portion of the second cylindrical element facing the at least partially rounded profile end portion of the first cylindrical element; and elastically expanding the elastomeric sleeve by inserting at least one removable support element in a radially inner position with respect to the elastomeric sleeve.

18 Claims, 3 Drawing Sheets

(51) Int. Cl.
*H02G 15/184* (2006.01)
*H02G 15/18* (2006.01)

(56) References Cited

U.S. PATENT DOCUMENTS

| | | | |
|---|---|---|---|
| 6,025,560 A * | 2/2000 | De Buyst et al. | 174/88 C |
| 6,495,757 B2 * | 12/2002 | Van Boxstael et al. | 174/88 R |
| 6,787,703 B2 * | 9/2004 | Niinobe et al. | 174/73.1 |
| 2003/0188885 A1 | 10/2003 | Niinobe et al. | |
| 2004/0258863 A1 * | 12/2004 | Kobayashi et al. | 428/34.9 |
| 2007/0039692 A1 | 2/2007 | Kobayashi et al. | |
| 2008/0135288 A1 | 6/2008 | Taylor et al. | |
| 2009/0218135 A1 * | 9/2009 | Vallauri et al. | 174/88 |
| 2010/0276831 A1 | 11/2010 | Kobayashi et al. | |

FOREIGN PATENT DOCUMENTS

| | | |
|---|---|---|
| RU | 21255 U1 | 12/2001 |
| RU | 2396659 C1 | 8/2010 |
| WO | WO-2007074480 A1 | 7/2007 |

OTHER PUBLICATIONS

Dec. 16, 2014, Russian Decision of Grant received in RU 2013133914/07 (050734) with translation.
Jul. 3, 2015, Chinese Office Action issued in corresponding Chinese Application No. 201080070829.9 (with translation).

* cited by examiner

PROCESSES FOR MANUFACTURING JOINTING ASSEMBLIES FOR MEDIUM OR HIGH VOLTAGE ELECTRICAL CABLES AND JOINTING ASSEMBLIES OBTAINABLE BY THE PROCESSES

CROSS-REFERENCE TO RELATED APPLICATION(S)

This application is a national stage entry from International Application No. PCT/EP2010/007852, filed on Dec. 22, 2010, in the Receiving Office of the European Patent Office, the entire contents of which are incorporated herein by reference.

The present invention relates to a process for manufacturing a jointing assembly for medium or high voltage electrical cables.

The invention also relates to a jointing assembly for medium or high voltage electrical cables obtainable by the aforementioned process.

In the present description, the term "medium voltage" is used to refer to a tension typically from about 1 kV to about 30 kV, while the term "high voltage" refers to a tension above 30 kV. The term "very high voltage" is used to define a voltage greater than about 150 kV or 220 kV, up to 500 kV or more.

In order to make the present description clearer, reference will be made to a joint, that is a jointing assembly specifically provided for mechanically and electrically connecting two electrical cables. However, the skilled person will understand that analogous considerations apply when considering a termination, that is a jointing assembly specifically provided for mechanically and electrically connecting an electrical cable to a different device, in those cases where such a termination comprises features analogous to those described with respect to the joint. The aforementioned different device can be for example an electrical power source, a transformer, a user device etc.

As known, the joints for medium and high voltage electrical cables typically comprise a radially elastomeric sleeve made from a dielectric material and adapted to be shrunk over a connector connecting the conductors of two electrical cables and over the end portions of the insulation layers of such electrical cables.

In the above-described joints, conductive or semi-conductive elements are typically provided within the elastomeric sleeve in correspondence of the connector and of the end portions of the cable screen, to control the electric field within the joint, in particular to avoid the presence of areas with high concentration of electrical field, wherein undesired electrical discharges and breakdowns could occur.

EP 0 435 569 discloses a radially shrinkable cylindrical sleeve for enclosing a connection or a terminal, respectively, of a medium voltage electrical cable, the cable including a conductor, an insulation surrounding the conductor and a shielding layer surrounding the insulation. The sleeve comprises an outer layer made from a semi-conductive material, a middle layer made of liquid-silicone rubber and an inner layer which is composed of two end portions and a median portion which is spaced from the end portions. Said layers are formed by injection moulding. The end portions consist of stress controlling dielectric material. The median portion acts as an electrode. The end portions and the median portion are embedded in the insulation material and have preferably the same wall thickness.

U.S. Pat. No. 4,390,745 discloses an enclosure for electrical apparatus comprising a first hollow sleeve of insulating material around which it is positioned a second sleeve comprising an inner layer of insulating material and an outer layer of conductive material (normally connected to the earth, e.g. a cable shield). The first sleeve may have an innermost laminated layer of stress grading material. An embodiment is disclosed wherein a sleeve of electrically insulating material having an inner lining of stress gradient material and innermost layers of electrically conducting material at its central and end portions is provided.

With specific reference to joints for high voltage electrical cables, WO 2007/074480 discloses a method of splicing or joining electric cables together and a related joint. The joint comprises a covering sleeve in the form of a tubular sleeve. The sleeve comprises a primary tubular body including one or more annular inserts of semi-conductive material, integrated into at least one layer of insulating material which the reference indicates as electrode and deflectors (or cups).

The Applicant observed that in a joint of the above-described type the electrode and the deflectors are separately made by moulding. When separately moulding these components, great attention must be paid to the material and/or design of the respective mould in order to provide the electrode and the deflectors with the desired shape, so as to provide an effective electrical field control within the joint. The separate manufacturing steps of the electrode and the deflectors make the manufacturing process of the joint complex and time-consuming.

The Applicant faced the technical problem of reducing the time and the complexity of the manufacturing of the joint, and in particular the manufacturing of the electrode and deflectors, while maintaining the desired ability to control the electric field in a joint for medium or high voltage electrical cables.

The Applicant found that this problem can be solved by a process in which electrode and deflectors of a jointing assembly are obtained by cutting in portions of suitable length a tubular element and by machining the ends of these portions Accordingly, in a first aspect thereof, the present invention relates to a process for manufacturing a jointing assembly for medium or high voltage electrical cables, comprising:
  forming a tubular element made from a semi-conductive material;
  cutting out of said tubular element a first cylindrical element having a first length and a second cylindrical element having a second length;
  machining an end portion of said first cylindrical element and an end portion of said second cylindrical element to provide them with an at least partially rounded profile;
  arranging said first cylindrical element at a radially inner surface of an elastomeric sleeve made from a dielectric material and extending about a longitudinal axis;
  arranging said second cylindrical element at a free end portion of said elastomeric sleeve, and spaced apart from said first cylindrical element, with the rounded end portion of said second cylindrical element facing the rounded end portion of said first cylindrical element;
  elastically expanding said elastomeric sleeve by inserting at least one removable support element in a radially inner position with respect to said elastomeric sleeve.

In a second aspect thereof, the present invention relates to a jointing assembly for medium or high voltage electrical cables, comprising:
  an elastomeric sleeve made from a dielectric material and extending about a longitudinal axis;
  at least one removable support element coaxially arranged with respect to said elastomeric sleeve in a radially inner position thereof and adapted to hold said elastomeric sleeve in a radially expanded state;

a first cylindrical element arranged at a radially inner surface of said elastomeric sleeve, said first cylindrical element having a first length and extending about said longitudinal axis for a portion of said elastomeric sleeve;

a second cylindrical element arranged at at least one free end portion of said elastomeric sleeve, said second cylindrical element having a second length and being spaced apart from said first cylindrical element;

wherein said first cylindrical element and said second cylindrical element have the same outer diameter and comprise respective end portions facing to each other and having an at least partially rounded profile obtained by machining.

Throughout the present description and in the following claims, the terms "radial" and "axial" (or "longitudinal") are used to indicate a perpendicular direction and a parallel direction, respectively, to a reference longitudinal axis of the jointing assembly, the above reference longitudinal axis being defined by the longitudinal axis of the elastomeric sleeve. The expression "radially inner/outer" is instead used by referring to the position along a radial direction with respect to the abovementioned longitudinal axis, while the expression "axially inner/outer" is used by referring to the position along a parallel direction to the aforementioned longitudinal axis and with respect to a plane perpendicular to said longitudinal axis and intersecting the elastomeric sleeve in a central portion thereof.

In least one of the aforementioned aspects the present invention can comprise at least one of the following preferred features.

Preferably, said at least partially rounded profile is obtained by grinding, more preferably by using a shaped grinding wheel.

Preferably, the process comprises arranging a connector extending about said longitudinal axis coaxially to said first cylindrical element in a radially inner position with respect to said first cylindrical element.

In a preferred embodiment, said first cylindrical element and said second cylindrical element are defined by respective inserts incorporated into a radially inner layer of said dielectric material.

In a particularly preferred embodiment, said tubular element is manufactured by extrusion. Alternatively said tubular element can be manufactured by moulding.

Preferably, said tubular element has a constant outer diameter. More preferably, said tubular element has a constant thickness.

Preferably, the process of manufacturing a jointing assembly comprises:
  obtaining from said tubular element two second cylindrical elements;
  symmetrically arranging said two second cylindrical elements on opposite side with respect to said first cylindrical element at two opposite free end portions of said elastomeric sleeve.

Preferably, the jointing assembly comprises a connector arranged in a radially inner position with respect to said first cylindrical element and extending about said longitudinal axis coaxially to said first cylindrical element.

Preferably, said first cylindrical element and said at least one second cylindrical element are obtained from a single tubular element made from a semi-conductive material.

Preferably, said tubular element is manufactured by extrusion.

In a particularly preferred embodiment, the jointing assembly comprises two second cylindrical elements, said two second cylindrical elements being symmetrically arranged on opposite sides with respect to said first cylindrical element at two opposite free end portions of said elastomeric sleeve.

Further features and advantages of the present invention will appear more clearly from the following detailed description of some preferred embodiments thereof, such description being provided merely by way of non-limiting examples and being made with reference to the annexed drawings. In such drawings.

Figure 1:
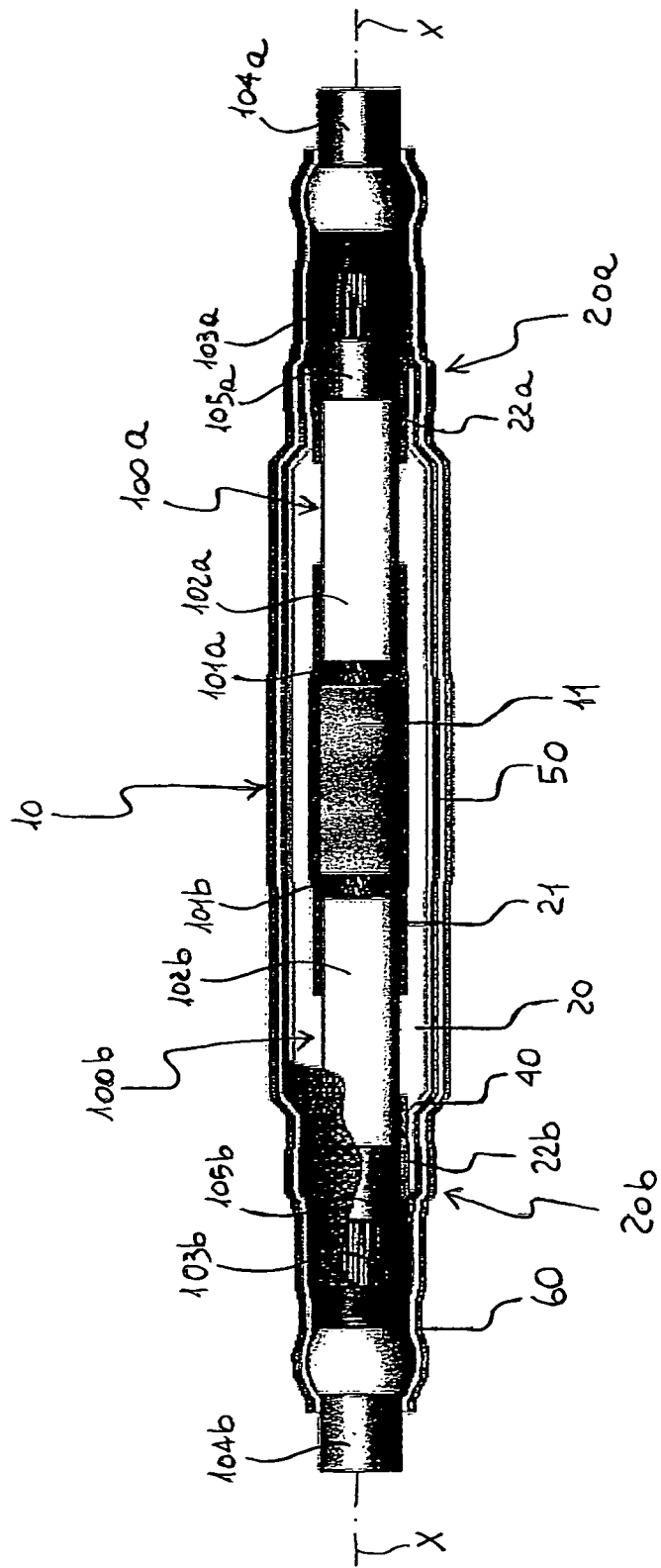
FIG. 1 is a schematic, partially sectioned, view of an embodiment of a jointing assembly according to the present invention in an operative configuration wherein it mechanically and electrically connects two electrical cables.

With respect to FIG. 1, a jointing assembly for medium or high voltage electrical cables according to the present invention is indicated with numeral reference 10. In particular, the jointing assembly of FIG. 1 is a joint which is shown in an operative configuration wherein it mechanically and electrically connects two high voltage electrical cables 100a, 100b.

Each electrical cable 100a, 100b comprises at least one conductor 101a, 101b and an insulating layer 102a, 102b coaxially applied at a radially outer position to the at least one conductor 101a, 101b. A conductive screen 103a, 103b is coaxially applied at a radially outer position to the insulating layer 102a, 102b. The conductive screen 103a, 103b is in turn covered with at least one protective sheath 104a, 104b of electrically insulating plastic or elastomeric material.

As shown in FIG. 1, preferably each electrical cable 100a, 100b further comprises at least one semi-conductive coating 105a, 105b radially interposed between the insulating layer 102a, 102b and the conductive screen 103a, 103b.

In order to expose the conductors 101a, 101b, the end portion of each cable 100a, 100b is treated in such a manner that the conductors 101a, 101b axially project by a predetermined amount with respect to the respective outer layers, as clearly shown in FIG. 1.

Figure 2:
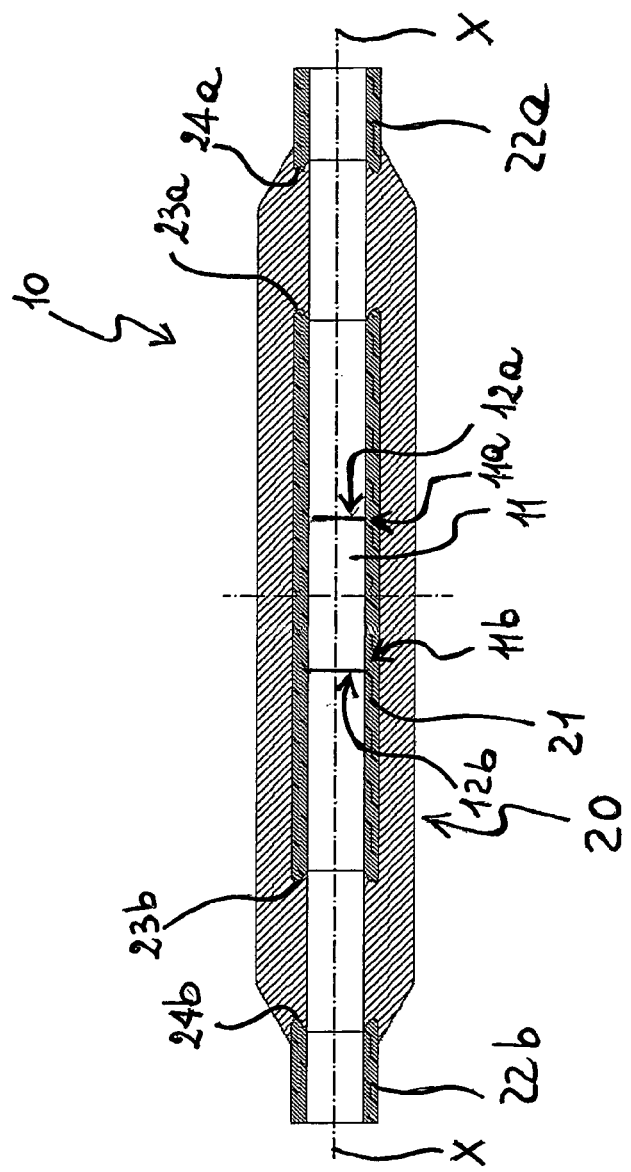
FIG. 2 is a schematic enlarged sectional view of a portion of the jointing assembly of FIG. 1.

As better shown in FIG. 2, the joint 10 comprises a connector 11 extending about a longitudinal axis X-X.

The connector 11 is a socket connector, that is it comprises axially opposite end portions 11a, 11b each provided with a seat 12a, 12b adapted to house and lock into a desired axial position a respective plug-in connector (not shown) associated with a free end portion of a respective electrical cable 100a, 100b.

After each of the connectors associated with the end portions of the electrical cables 100, 100b is inserted into the respective seat 12a, 12b, this connector is mechanically coupled to the connector 11 in a conventional manner, thus providing an electrical connection between the two electrical cables.

The connector 11 is made from a metallic material, preferably tinned aluminium. It comprises two opposite axially outer surfaces and a radial tubular surface.

In an alternative embodiment (not shown), the connector 11 is not part of the jointing assembly but it is a separate element. In this case, before connecting the end portions of the two cables to the aforementioned connector, the jointing assembly (with no connector therein) is parked in a position on one of the two cables. Afterwards, the jointing assembly is displaced and positioned over the aforementioned connector and the end portions of the two cables attached thereto.

As shown in FIGS. 1 and 2, the jointing assembly 10 comprises, in a radially outer position with respect to the connector 11, an elastomeric sleeve 20. The sleeve 20 can be made from heat or cold shrinkable dielectric materials. Preferably, the sleeve 20 is made of a cold shrinkable dielectric material, such as rubber EPDM.

The sleeve 20 extends coaxially to the longitudinal axis X-X and has a length greater than that of the connector 11. The connector 11 is centrally arranged within the sleeve 20 along the longitudinal axis X-X so as to have a symmetrical arrangement of the sleeve 20 about the connector 11 along the longitudinal axis X-X.

The sleeve 20 comprises, at a radially inner portion thereof, a first cylindrical insert 21 made from a semi-conductive material. Throughout the following description, the insert 21 will be indicated as "electrode".

The electrode 21 extends coaxially to the longitudinal axis X-X and has a length greater than that of the connector 11 and lower than that of the sleeve 20. The electrode 21 is symmetrically arranged with respect the connector 11 and the sleeve 20 along the longitudinal axis X-X.

The sleeve 20 further comprises, at each of the end portions 20a, 20b thereof, a respective second cylindrical insert 22a, 22b, made from a semi-conductive material. Throughout the following description, the inserts 22a, 22b will be indicated as "deflectors".

The deflectors 22a, 22b cooperate with the electrode 21 to control the electrical field within the sleeve 20, in particular to avoid the presence of areas with high concentration of electrical field, wherein undesired electrical discharges and breakdowns could occur.

Each of the deflectors 22a, 22b extends coaxially to the longitudinal axis X-X and axially projects inside the sleeve 20 toward the electrode 21 so that the radially inner portion of the sleeve 20 is defined, moving from the central portion toward each of the end portions 20a, 20b thereof, by the electrode 21, the dielectric material of the sleeve 20 and the deflector 22a, 22b.

In the jointing assembly of FIG. 1 the electrode 21 and the deflectors 22a, 22b are thus incorporated into the dielectric material of the sleeve 20.

In an alternative embodiment (not shown) of the jointing assembly of the present invention, the electrode and the deflectors are not incorporated into the dielectric material of the sleeve 20, but are arranged in a radially inner position with respect to the radially inner surface of the sleeve 20.

Figure 3:
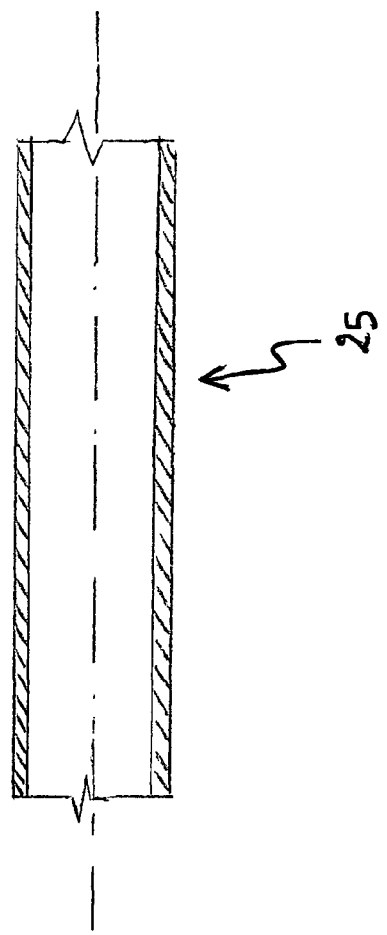
FIG. 3 is a schematic enlarged sectional view of a portion of a tubular element used in the manufacturing process of the jointing assembly of FIG. 1.

The electrode 21 and at least one of the two deflectors 22a, 22b are both obtained from a single tubular element 25 (FIG. 3) made from a semi-conductive material. Preferably, this material is a cold shrinkable semi-conductive material, more preferably rubber EPDM.

While it is foreseen an embodiment wherein the aforementioned tubular element 25 is manufactured by moulding, it is preferred to manufacture the aforementioned tubular element by extrusion.

For example, an extrusion by vapour pressure can be carried out. In this case, a metallic support tube must be arranged within the extrusion device. Alternatively, an extrusion using fused salt or micro-wave or gamma rays can be carried out. In this case no metallic support tube must be arranged within the extrusion device.

Advantageously, the extrusion manufacturing technique, specifically when no metallic support tube is required, allows high productivity and low costs of labour to be achieved when comparing to a conventional moulding technique.

Preferably, the tubular element 25 has a constant outer diameter, so that the electrode 21 and the deflectors 22a, 22b have an identical outer diameter. Preferably, the tubular element 25 has a constant thickness, so that the electrode 21 and the deflectors 22a, 22b have identical outer and inner diameters. Indeed, the Applicant noticed that such a configuration is particularly adapted to obtain an effective electrical control field.

Advantageously, once the tubular element 25 is manufactured it is cut to size in two or more parts, thus obtaining at least two cylindrical elements of different length which are adapted to form the electrode 21 and at least one of the two deflectors 22a, 22b.

In order to properly act as field control means, the opposite end portions 23a, 23b of the electrode 21 are shaped so as to provide them with a rounded profile. Analogously, each of the deflector end portions 24a, 24b faced to a respective electrode end portion 23a, 23b is also shaped so as to provide it with a rounded profile.

With "rounded profile" it is intended a profile having no sharp edges. Therefore, it is encompassed a totally curved profile or a profile comprising one or more curved portions gradually joined to one or more rectilinear portions. The curved portions can have a single radius of curvatures or can comprise different portions with different radius of curvature. Inflexion points may also be present in the rounded profile.

Preferably, the rounded profile of the end portions 23a, 23b of the electrode 21 is identical to the rounded profile of the end portions 24a, 24b of the deflectors 22a, 22b faced thereto, respectively.

The aforementioned rounded profiles are obtained by machining the end portions of the cylindrical elements obtained from the aforementioned tubular element 25 by a proper tool, preferably a properly shaped grinding wheel.

The sleeve 20, together with the electrode 21 and the deflectors 22a, 22b, is held in a radially expanded state by support elements (not shown) which are radially interposed between the connector 11 and the sleeve 20 and symmetrically arranged along the longitudinal axis X-X with respect to the connector 11.

The support elements can be in the form of two tubular elements and are held within the sleeve 20 by a connecting element which associates the tubular elements with each other.

After having mechanically and electrically coupled the two electrical cables to the connector 11, the tubular elements are axially removed from the opposite end portions 20a, 20b of the sleeve 20 along opposite directions, thus causing the sleeve 20, together with the electrode 21 and the deflectors 22a, 22b, to shrink onto the connector 11 and each of the cable end portions connected thereto. In order to remove the support elements, the aforementioned connecting element is broken.

In an alternative embodiment (not shown) of the jointing assembly of the present invention, each support element is defined by a helically wound strip which is adapted to be removed from the respective end portion of the sleeve by pulling a free end portion of the strip.

The jointing assembly 10 of FIG. 1 further comprises, in a radially outer position with respect to the sleeve 20, a first coating shield 40. The shield 40 has a length substantially equal to that of the sleeve 20.

Preferably, the shield 40 is made of a two-layer sheath including an radially inner layer and a radially outer layer.

The radially inner layer is preferably made from a dielectric material, more preferably rubber EPDM. The radially outer layer is preferably made from a semi-conductive material, more preferably rubber EPDM.

Alternatively the shield 40 can be made of a one-layer sheath, preferably made from a semi-conductive material, more preferably rubber EPDM.

In a radially outer position with respect to the first shield 40, a metallic screen 50 is provided. The screen 50 has a length greater than that of the sleeve 20 and is preferably made of tinned copper.

The jointing assembly 10 further comprises, in a radially outer position with respect to the screen 50, a second shield 60 having preferably a length higher than that of the screen 50.

Preferably, the shield 60 is made of a two-layer sheath, that is it includes a radially inner layer made from a dielectric material and a radially outer layer made from a semi-conductive material. More preferably, the same material of the shield 40 is used.

Alternatively the shield 60 can be made of a one-layer sheath, preferably made from a dielectric material, more preferably rubber EPDM.

The skilled person will understand that, starting from the above described different embodiments of the jointing assembly of the present invention, a plurality of further different embodiments can be foreseen by combining in different ways the various features described above. All these embodiments are indeed encompassed by the present invention and are within the scope of protection defined by the attached claims.

While the above description has been made referring to a jointing assembly for connecting two medium or high voltage electrical cables, that is a joint, the description also apply in the case of a jointing assembly for connecting a medium or high voltage electrical cable to a different device (such as for example an electrical power source, a transformer, a user device), that is a termination, in those cases where such a termination comprises features analogous to those herewith described and/or claimed. Therefore, both a joint and a termination are encompassed by the present invention and are within the scope of protection defined by the attached claims.

The invention claimed is:

1. A process for manufacturing a jointing assembly for medium or high voltage electrical cables, the process comprising:
    forming a tubular element made from a semi-conductive material;
    cutting out of the tubular element a first cylindrical element having a first length and a second cylindrical element having a second length;
    machining an end portion of the first cylindrical element to provide the end portion with an at least partially rounded profile;
    machining an end portion of the second cylindrical element to provide the end portion with an at least partially rounded profile;
    arranging the first cylindrical element at a radially inner surface of an elastomeric sleeve made from a dielectric material and extending about a longitudinal axis;
    arranging the second cylindrical element at a free end portion of the elastomeric sleeve, and spaced apart from the first cylindrical element, with the at least partially rounded profile end portion of the second cylindrical element facing the at least partially rounded profile end portion of the first cylindrical element; and
    elastically expanding the elastomeric sleeve by inserting at least one removable support element in a radially inner position with respect to the elastomeric sleeve.

2. The process of claim 1, wherein the at least partially rounded profile end portions are obtained by grinding.

3. The process of claim 1, further comprising:
    arranging a connector extending about the longitudinal axis coaxially to the first cylindrical element in a radially inner position with respect to the first cylindrical element.

4. The process of claim 1, wherein the first cylindrical element and the second cylindrical element are defined by respective inserts incorporated into a radially inner layer of the dielectric material.

5. The process of claim 1, wherein the tubular element is manufactured by extrusion.

6. The process of claim 1, wherein the tubular element has a constant outer diameter.

7. The process of claim 1, wherein the tubular element has a constant thickness.

8. The process of claim 1, further comprising:
    obtaining from the tubular element two second cylindrical elements; and
    symmetrically arranging the two second cylindrical elements on opposite sides with respect to the first cylindrical element at two opposite free end portions of the elastomeric sleeve.

9. A jointing assembly for medium or high voltage electrical cables, the jointing assembly comprising:
    an elastomeric sleeve made from a dielectric material and extending about a longitudinal axis;
    at least one removable support element coaxially arranged with respect to the elastomeric sleeve in a radially inner position thereof and adapted to hold the elastomeric sleeve in a radially expanded state;
    a first cylindrical element arranged at a radially inner surface of the elastomeric sleeve, the first cylindrical element having a first length and extending about the longitudinal axis for a portion of the elastomeric sleeve; and
    a second cylindrical element arranged at at least one free end portion of the elastomeric sleeve, the second cylindrical element having a second length and being spaced apart from the first cylindrical element;
    wherein the first cylindrical element and the second cylindrical element have a same outer diameter and comprise respective end portions facing to each other and having an at least partially rounded profile obtained by machining.

10. The jointing assembly of claim 9, further comprising:
    a connector arranged in a radially inner position with respect to the first cylindrical element and extending about the longitudinal axis coaxially to the first cylindrical element.

11. The jointing assembly of claim 9, wherein the first cylindrical element and the second cylindrical element are defined by respective inserts incorporated into a radially inner layer of the dielectric material.

12. The jointing assembly of claim 9, wherein the first cylindrical element and the second cylindrical element are obtained from a single tubular element made from a semiconductive material.

13. The jointing assembly of claim 12, wherein the tubular element is manufactured by extrusion.

14. The jointing assembly of claim 9, further comprising:
    two second cylindrical elements;
    wherein the two second cylindrical elements are symmetrically arranged on opposite sides with respect to the first cylindrical element at two opposite free end portions of the elastomeric sleeve.

15. The process of claim 2, further comprising:
    arranging a connector extending about the longitudinal axis coaxially to the first cylindrical element in a radially inner position with respect to the first cylindrical element.

16. The jointing assembly of claim 10, wherein the first cylindrical element and the second cylindrical element are defined by respective inserts incorporated into a radially inner layer of the dielectric material.

17. The jointing assembly of claim 12, wherein the tubular element has a constant outer diameter.

18. The jointing assembly of claim 12, wherein the tubular element has a constant thickness.

\* \* \* \* \*